(12) United States Patent
Pylkkänen et al.

(10) Patent No.: US 12,411,077 B2
(45) Date of Patent: Sep. 9, 2025

(54) MONITORING RELIABILITY OF ANALYSIS OF ELEMENTAL COMPOSITION OF A SAMPLE

(71) Applicant: Hitachi High-Tech Analytical Science Finland Oy, Espoo (FI)

(72) Inventors: Tuomas Pylkkänen, Helsinki (FI); Antti Virolainen, Helsinki (FI)

(73) Assignee: HITACHI HIGH-TECH ANALYTICAL SCIENCE FINLAND OY, Espoo (FI)

( * ) Notice: Subject to any disclaimer, the term of this patent is extended or adjusted under 35 U.S.C. 154(b) by 258 days.

(21) Appl. No.: 17/888,910

(22) Filed: Aug. 16, 2022

(65) Prior Publication Data
US 2023/0057117 A1 Feb. 23, 2023

(30) Foreign Application Priority Data
Aug. 17, 2021 (EP) .................................... 21191647

(51) Int. Cl.
*G01N 21/25* (2006.01)
*G01N 21/57* (2006.01)
(Continued)

(52) U.S. Cl.
CPC ............ *G01N 21/25* (2013.01); *G01N 21/57* (2013.01); *G01N 21/8422* (2013.01);
(Continued)

(58) Field of Classification Search
None
See application file for complete search history.

(56) References Cited

U.S. PATENT DOCUMENTS

| 8,913,807 B1 * | 12/2014 | Horn ...................... G06V 10/56 |
| | | 382/128 |
| 2005/0029461 A1 * | 2/2005 | Malmin .................. G01T 1/202 |
| | | 250/367 |

(Continued)

FOREIGN PATENT DOCUMENTS

| AU | 2006254689 A1 * | 1/2008 | ............... A61B 6/00 |
| CN | 103345576 A | * 10/2013 | |

(Continued)

OTHER PUBLICATIONS

Search Report for EP21191647, dated Dec. 15, 2021, 2 pages.

*Primary Examiner* — Ricky Chin
(74) *Attorney, Agent, or Firm* — NIXON & VANDERHYE, PC (57) ABSTRACT

Disclosed is an instrument analyzing elemental composition of a sample, including a measurement assembly including: an exciter generating an excitation directed at a target position to cause emission from the sample; a detector assembly receiving the emission from the sample at the target position, arranged to generate one or more measurement signals that are descriptive of the emission; an imaging apparatus for capturing images of an area around the target position; and a controller for carrying out a measurement, arranged to operate the exciter to generate the excitation and to carry out analysis of the elemental composition of the sample based on the measurement signals. The controller performs reliability analysis associated with the measurement by operating the imaging apparatus to capture images of the sample, determining estimated reliability of the measurement based on the captured images, and selectively issuing an indication of measurement reliability based on the estimated reliability.

19 Claims, 3 Drawing Sheets

(51) Int. Cl.
*G01N 21/84* (2006.01)
*G01N 23/04* (2018.01)
*G06T 7/00* (2017.01)

(52) U.S. Cl.
CPC ........... *G01N 23/04* (2013.01); *G06T 7/0002* (2013.01); *G06T 2200/24* (2013.01); *G06T 2207/20081* (2013.01); *G06T 2207/20084* (2013.01)

(56) References Cited

U.S. PATENT DOCUMENTS

| | | | |
|---|---|---|---|
| 2010/0290051 A1* | 11/2010 | Yamada | G01N 21/8483 356/445 |
| 2011/0079734 A1* | 4/2011 | Grodzins | G01N 23/223 378/45 |
| 2013/0300919 A1* | 11/2013 | Fletcher | H04N 17/002 348/360 |
| 2014/0219535 A1* | 8/2014 | Chen | G01R 33/50 382/131 |
| 2015/0245009 A1* | 8/2015 | Tozuka | H04N 1/6086 433/29 |
| 2015/0308961 A1* | 10/2015 | Burg | G01N 21/78 |
| 2017/0347968 A1* | 12/2017 | Maile | A61B 5/7264 |
| 2018/0315194 A1* | 11/2018 | Moult | A61B 3/0025 |
| 2019/0311877 A1* | 10/2019 | Willis | H01J 37/28 |
| 2020/0004629 A1* | 1/2020 | Zamir | G06F 3/064 |
| 2020/0184634 A1* | 6/2020 | McLeod | G06T 7/0012 |
| 2020/0327670 A1* | 10/2020 | Connor | G06T 19/006 |
| 2020/0341266 A1* | 10/2020 | Räikkönen | G01J 3/0208 |
| 2021/0022646 A1* | 1/2021 | Li | G06F 18/22 |
| 2021/0177374 A1* | 6/2021 | Balicki | G16H 10/20 |
| 2022/0036137 A1* | 2/2022 | Muselli | G06F 18/2178 |
| 2022/0082567 A1* | 3/2022 | Gerlach | G01N 21/6486 |
| 2022/0183550 A1* | 6/2022 | Campin | A61B 3/102 |
| 2022/0283097 A1* | 9/2022 | Alperowitz | G01N 33/487 |
| 2022/0283148 A1* | 9/2022 | Aysin | G06T 7/0014 |
| 2022/0373393 A1* | 11/2022 | Räikkönen | G01J 3/06 |
| 2023/0057117 A1* | 2/2023 | Pylkkänen | G01N 21/718 |
| 2023/0098785 A1* | 3/2023 | St. Pierre | G16H 30/40 600/424 |
| 2023/0121265 A1* | 4/2023 | Nienstedt | G16H 40/40 705/2 |
| 2023/0152775 A1* | 5/2023 | Yang | H01L 21/67276 700/213 |
| 2023/0360437 A1* | 11/2023 | Shin | G06T 7/10 |
| 2023/0410981 A1* | 12/2023 | Notoshi | A61B 6/467 |

FOREIGN PATENT DOCUMENTS

| | | | | |
|---|---|---|---|---|
| CN | 106725612 A | * | 5/2017 | ............ A61B 8/085 |
| CN | 107669262 A | * | 2/2018 | |
| CN | 109582797 A | * | 4/2019 | ............ G16H 10/00 |
| CN | 110047069 A | * | 7/2019 | ........... G01N 3/0454 |
| CN | 110335676 A | * | 10/2019 | |
| CN | 110660459 A | * | 1/2020 | ....... G06Q 10/06395 |
| CN | 111062929 A | * | 4/2020 | ........... G06T 7/0012 |
| CN | 111912835 | | 11/2020 | |
| CN | 113112473 A | * | 7/2021 | ............ A61B 5/055 |
| WO | WO-2006/128302 | * | 12/2001 | ............ A61B 5/00 |
| WO | 02/057758 | | 7/2002 | |
| WO | 2004/082474 | | 9/2004 | |
| WO | 2005/107578 | | 11/2005 | |

* cited by examiner

| Operate an imaging apparatus to capture one or more images of a surface of a sample
202 |

| Determine estimated reliability of a measurement carried out on the sample on basis of the one or more images
204 |

| Selectively issue an indication of reliability of the measurement in dependence of the estimated reliablity
206 |

MONITORING RELIABILITY OF ANALYSIS OF ELEMENTAL COMPOSITION OF A SAMPLE

CROSS-REFERENCE TO RELATED APPLICATIONS

This application claims priority to EP patent application Ser. No. 21/191,647.3 filed Aug. 17, 2021, the entire contents of which is hereby incorporated by reference.

BACKGROUND OF THE INVENTION

Field of the Invention

The present invention relates to analysis of elemental composition of a sample and, in particular, to monitoring quality and/or reliability of the analysis.

Description of the Related Art

There are various techniques available for carrying out an analysis of elemental composition of a sample. Techniques such as X-ray fluorescence (XRF), laser induced breakdown spectroscopy (LIBS) and optical emission spectroscopy (OES) are widely used in analyzer instruments provided for elemental analysis of objects and/or materials of various kind, both in field conditions and in laboratory conditions. Analyzer instruments come in different shapes and sizes, including mobile instruments and stationary instruments, where a mobile instrument may be a handheld one or one that is moveable on wheels, whereas a stationary instrument may be provided as a benchtop (or desktop) instrument. A choice of most suitable analysis technique for a given analyzer instrument may depend on physical characteristic (e.g. size) of the analyzer instrument, its intended operation environment, on types of samples and/or elements intended for analysis using the analyzer instrument, etc. As non-limiting examples in this regard, XRF and LIBS are typically applicable in analyzer instruments of all kinds (e.g. handheld, (otherwise) mobile and stationary ones), whereas OES is typically applied in larger mobile (e.g. non-handheld) and stationary analyzer instruments.

Even though analyzer instruments making use of e.g. XRF, LIBS or OES are reliable and robust in analyzing a range materials and/or elements they are designed for, in many real-life usage scenarios of analyzer instruments characteristics of a sample under study may compromise reliability of the analysis or may even render the sample unsuited for the analysis.

SUMMARY OF THE INVENTION

It is therefore an object of the present invention to provide an approach for monitoring of quality and/or reliability of an analysis of elemental composition of a sample carried out based on measurements carried out by an analyzer instrument.

In the following a simplified summary of some embodiments of the present invention is provided in order to facilitate a basic understanding of the invention. The summary is not, however, an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with an example embodiment of the invention, an analyzer instrument for analysis of elemental composition of a sample is provided, the analyzer instrument comprising a measurement assembly comprising: an exciter for generating an excitation directed at a target position to invoke an emission from the sample positioned at the target position; a detector assembly for receiving the emission from the sample positioned at the target position, arranged to generate one or more measurement signals that are descriptive of said emission; an imaging apparatus for capturing images of an area around the target position; and a controller for carrying out a measurement, where the controller is arranged to operate the exciter to generate the excitation and to carry out analysis of the elemental composition of the sample on basis of the one or more measurement signals, wherein the controller is arranged to carry out a reliability analysis associated with the measurement, where the controller is arranged to: operate the imaging apparatus to capture one or more images of the sample, determine estimated reliability of the measurement on basis of the captured one or more images of the sample, and selectively issue an indication pertaining to reliability of the measurement in dependence of said estimated reliability.

In accordance with another example embodiment of the invention, a system is provided, the system comprising an analyzer instrument for analysis of elemental composition of a sample and a server apparatus, wherein the analyzer instrument comprises a measurement assembly comprising: an exciter for generating an excitation directed at a target position to invoke an emission from the sample positioned at the target position; a detector assembly for receiving the emission from the sample positioned at the target position, arranged to generate one or more measurement signals that are descriptive of said emission; an imaging apparatus for capturing images of an area around the target position; and a controller for carrying out a measurement, where the controller is arranged to operate the exciter to generate the excitation and carry out analysis of the elemental composition of the sample on basis of the one or more measurement signals, wherein the controller is arranged to operate the imaging apparatus to capture one or more images of the sample and to provide a result of said analysis of elemental composition of the sample and the captured one or more images to the server apparatus; and the server apparatus is arranged to: determine estimated reliability of the measurement on basis of the captured one or more images of the sample, and selectively issue an indication pertaining to reliability of the measurement in dependence of said estimated reliability.

In accordance with another example embodiment of the invention, a method for analysis of elemental composition of a sample is provided, the method comprising: carrying out a measurement that comprises operating an exciter to generate an excitation directed at a target position to invoke an emission from the sample positioned at the target position; operating a detector assembly to generate one or more measurement signals that are descriptive of said emission; and carrying out analysis of the elemental composition of the sample on basis of the one or more measurement signals, wherein the method comprises carrying out a reliability analysis associated with the measurement, the reliability analysis comprising: capturing one or more images of the sample, determining estimated reliability of the measurement on basis of the captured one or more images of the sample, and selectively issuing an indication pertaining to reliability of the measurement in dependence of said estimated reliability.

In accordance with another example embodiment, a computer program is provided, the computer program comprising computer readable program code configured to cause performing at least a method according to an example embodiment described in the foregoing when said program code is executed on one or more computing apparatuses.

The computer program according to the above-described example embodiment may be embodied on a volatile or a non-volatile computer-readable record medium, for example as a computer program product comprising at least one computer readable non-transitory medium having the program code stored thereon, which, when executed by one or more computing apparatuses, causes the computing apparatuses at least to perform the method according to the example embodiment described in the foregoing.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF DRAWINGS

The embodiments of the invention are illustrated by way of example, and not by way of limitation, in the figures of the accompanying drawings, where FIG. 1 schematically illustrates some elements of a measurement assembly according to an example together with a sample.

DESCRIPTION OF THE PREFERRED EMBODIMENTS

Figure 1:
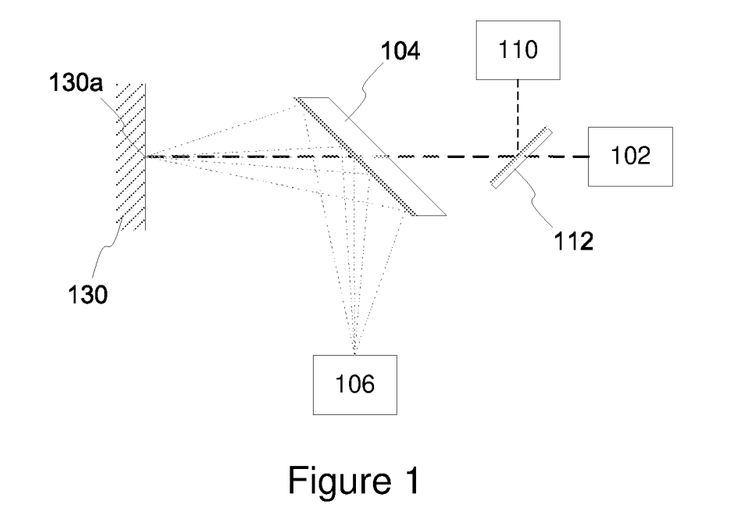
Figure 2:
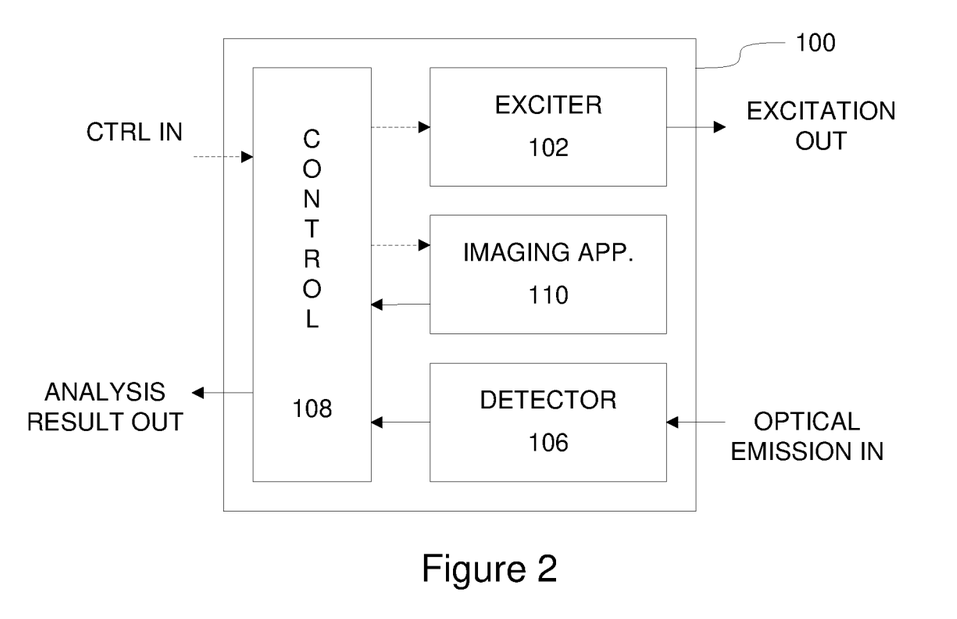
FIG. 2 illustrates a block diagram of some logical elements of the measurement assembly according to example.

FIG. 1 schematically illustrates some elements of a measurement assembly 100 according to an example together with a sample 130, where the measurement assembly 100 comprises an exciter 102 for generating an excitation in order to invoke an emission from the sample 130, a detector assembly 106 for generating one or more measurement signals that are descriptive of the emission invoked from the sample 130, and an imaging apparatus 110 for capturing one or more images of the sample 130. FIG. 2 illustrates a block diagram of some logical elements of the measurement assembly 100 according to an example. In this regard, FIG. 2 shows the exciter 102, the detector assembly 106, the imaging apparatus 110 and a controller 108 for controlling at least some aspects of operation of the exciter 102, the detector assembly 106 and the imaging apparatus 110 and for carrying out analysis of elemental composition of the sample 130 based on the one or more measurement signals generated in the detector assembly 106. Moreover, the controller 108 may be further provided for analyzing reliability of the analysis of elemental composition of the sample 130 carried out therein, where the reliability analysis may be based on one or more images of the sample captured by the imaging apparatus 110.

The measurement assembly 100 may be provided as part of an analyzer instrument that is useable for analysis of elemental composition of a sample 130. The analyzer instrument may be a mobile analyzer instrument or a stationary analyzer instrument: examples of the former include handheld analyzer instrument and (otherwise) portable analyzer instruments intended for outdoor or indoor use in field conditions, whereas examples of the latter include benchtop (or desktop) analyzer instruments intended primarily for indoor use in laboratory or factory conditions. The elements of the measurement assembly 100 may be arranged in a space within a housing of the analyzer instrument such that the excitation from the exciter 102 is directed and/or focused at a target position 130a and that the detector assembly 106 is able to receive the emission originating from the target position 130a. In this regard, the target position 130a is located outside the housing of the analyzer instrument, whereas the space containing the elements of the measurement assembly 100 is located within the housing in a location that can be conveniently brought into immediate vicinity of the sample 130 to bring the surface of the sample 130 at the target position 130a or, conversely, the space containing the elements of the measurement assembly 100 may be positioned in the housing such that the sample 130 can be conveniently brought into immediate vicinity thereof to bring the surface of the sample 130 at the target position 130a.

Each of the exciter 102, the detector assembly 106 and the controller 108 may be provided using respective techniques known in the art hence they are not described in detail in the present disclosure. However, for completeness of the description, in the following a few non-limiting examples of providing each of the exciter 102, the detector assembly 106 and the controller 108 are described at a high level, whereas further details concerning their characteristics and operation are provided, to extent that they may be relevant for the present disclosure, in context of examples that pertain to the controller 108 carrying out the reliability analysis based on images of the sample 130 obtained from the imaging apparatus 110.

In the example of FIG. 1, the exciter 102 may comprise a light source (e.g. a laser) and, consequently, the excitation originating therefrom may comprise a light beam or light pulses directed and/or focused at the target position 130a in order to invoke optical emission from the sample 130 positioned at the target position 130a, whereas the detector assembly 106 may comprise an image sensor or an optical receiver of other kind for receiving the optical emission from the sample 130 via a dispersing component such as a spectrometer and hence the one or more measurement signals generated by the detector assembly 106 may comprise signal(s) that are descriptive of relative light intensities at different wavelengths (e.g. image(s) of the dispersed optical emission from the sample 130). Examples of measurement arrangements according to the example of FIG. 1 include ones designed for LIBS or OES referred to in the foregoing.

Still referring to the example of FIG. 1, the excitation from the exciter to the target position 130a and/or the optical emission from the target position 130a to the detector assembly 106 may be transferred via an optical system provided therefor. In this regard, the example of FIG. 1 illustrates a light collecting mirror 104 that comprises an aperture to allow for transferring the excitation from the exciter 102 to the target position 130a through the light collecting mirror 104 that reflects the optical emission from the target position 130a towards the detector assembly 106, the light collecting mirror 104 hence serving as an example of the optical system. The example of FIG. 1 further illustrates the imaging apparatus 110 and a beam splitter 112, which is disposed in the propagation path of the excitation in an oblique angle thereto such that it folds the optical axis of the imaging apparatus 110 through the aperture in the light collecting mirror 104 while the beam splitter 112 transmits the excitation therethrough in the opposite direction. In this regard, the beam splitter 112 may comprise, for example, a dichroic mirror.

Figure 3:
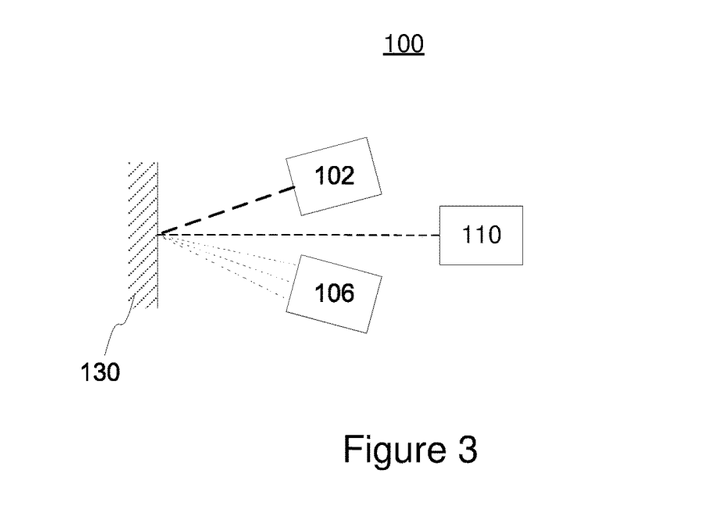
FIG. 3 schematically illustrates some elements of a measurement assembly according to an example together with a sample.

In another example, schematically illustrated in FIG. 3, the exciter 102 may comprise a radiation source (e.g. an X-ray tube) and hence the excitation originating therefrom may comprise primary radiation directed at the target position 130a such that it serves to invoke secondary radiation from the sample 130 positioned at the target position 130a, whereas the detector assembly 106 may comprise a detector of ionizing radiation (such as a silicon drift detector (SDD)) suitable for detecting the secondary radiation originating from the sample 130 and hence the one or more measurement signals generated by the detector assembly 106 may comprise signal(s) that are descriptive of intensity of the secondary radiation from the sample 130. An example of a measurement arrangement according to this example includes one designed for XRF referred to in the foregoing.

As described in the foregoing, the respective examples of FIGS. 1 and 3 are schematic ones that serve the purpose of conceptual illustration, while on the other hand the sizes and/or relative positions of the exciter 102, the detector assembly 106 and the imaging apparatus 110 applied in these illustrations may not reflect the sizes and/or relative positions of the respective elements of a real-life implementation of the measurement assembly 100 according to the respective examples. In particular, in the respective examples of FIGS. 1 and 3 the position of the imaging apparatus 110 with respect to the respective positions of the exciter 102 and the detector assembly 106 may be different from that shown in the examples of FIGS. 1 and 3 and it may be selected in view of the design and requirements of the analyzer instrument making use of the measurement assembly 100.

The imaging apparatus 110 may comprise a digital camera arranged to capture images of an area around the target position 130a under control of the controller 108. In this regard, the imaging apparatus 110 may be arranged to have its focus at the target position 130a.

The controller 108 may be provided, for example, by an apparatus that comprises a processor and a memory, where the memory is arranged to store computer program code that, when executed by the processor, causes the apparatus to operate as the controller 108 according to the present disclosure. A more detailed example of providing the controller 108 via usage of such an apparatus is provided in the following with references to FIG. 5. As particular examples of its operation, the controller 108 may be arranged to carry out a measurement in accordance with a measurement procedure in response to a trigger signal, where the trigger signal may be received, for example, via a user operating a user interface (UI) of the analyzer instrument making use of the measurement assembly 100 accordingly.

The measurement procedure may comprise the controller 108 operating the exciter 102 to generate the excitation and carrying out the analysis of elemental composition of the sample 130 based on the one or more measurement signals obtained from the detector assembly 106 as a response to the emission invoked from the sample 130 due to the excitation. A measurement result obtained from a measurement according to the measurement procedure comprises information that defines elements included in the sample 130 and it may further comprise information on their relative concentrations in the sample 130. Respective procedures for carrying out the analysis of elemental composition via usage of the measurement assembly 100 in the framework of techniques such as the XRF, LIBS and OES referred to above are well known in the art and they are not described in further detail in the present disclosure.

The controller 108 may further operate to display the measurement result via the UI of the analyzer instrument, to store the measurement result in a memory provided in the analyzer instrument and/or to transmit the measurement result to another device via usage of a communication apparatus available in the analyzer instrument, where the communication apparatus may enable wired and/or wireless communication between the analyzer instrument and the other device.

Figure 4:
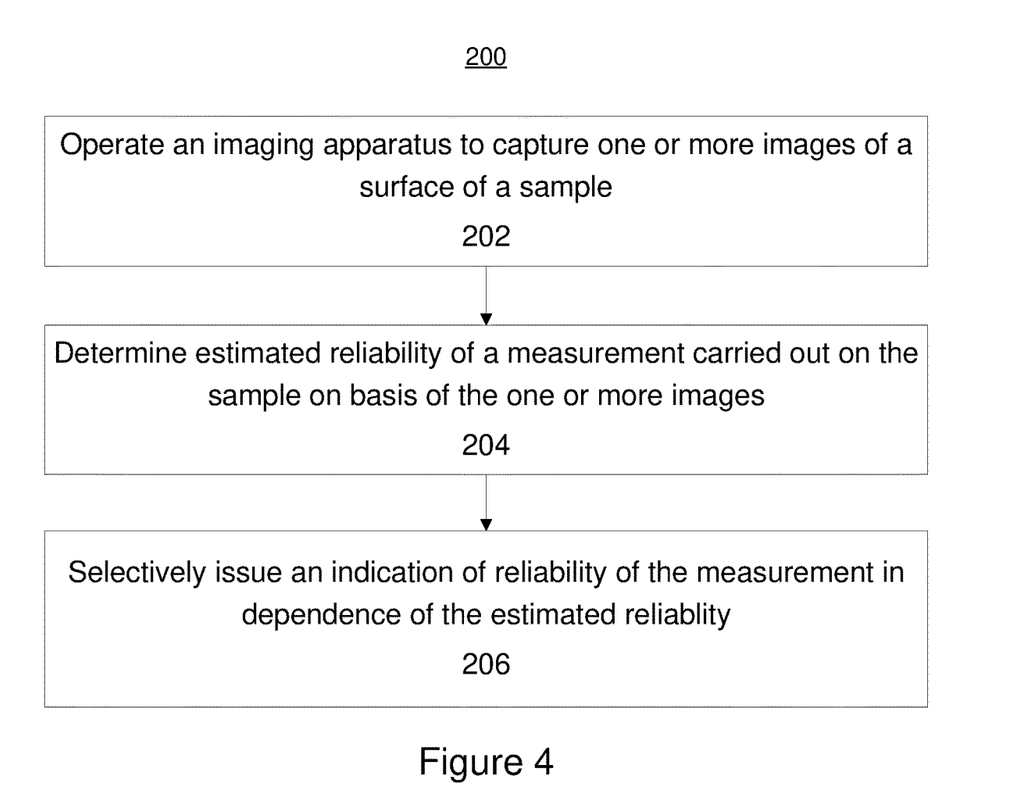
FIG. 4 illustrates a method according to an example.

Along the lines described in the foregoing, the controller 108 may further carry out the reliability analysis that is associated with a measurement carried out using the measurement assembly 100. The reliability analysis associated with a certain measurement may be carried out, for example, according to a method 200 illustrated in FIG. 4, where the method 200 comprises the following steps:

operate the imaging apparatus 110 to capture the one or more images of the surface of the sample 130, as indicated in block 202;

determine estimated reliability of the respective measurement on basis of said one or more images, as indicated in block 204; and selectively issue an indication pertaining to reliability of the respective measurement in dependence of said estimated reliability, as indicated in block 206.

While the one or more images considered in the reliability analysis are typically (and preferably) captured before carrying out the associated measurement, in various examples the reliability analysis outlined via blocks 202 to 206 of FIG. 4 may be carried out and/or completed before the associated measurement, concurrently with the associated measurement, or after the associated measurement. The reliability analysis outlined above via references to blocks 202 to 206 of FIG. 4 may be varied or complemented in a number of ways, for example as described in the examples provided in the foregoing and/or in the following.

In a first approach, the reliability analysis may comprise an image analysis carried out on the captured one or more images without any advance knowledge of expected characteristics of the sample 130 and without considering the measurement result obtained from the associated measurement. Hence, the reliability analysis according to the first approach may be carried out and/or completed before the associated measurement, concurrently with the associated measurement, or after the associated measurement. Typically, the one or more images considered in the reliability analysis are captured before carrying out the associated measurement.

Still referring to the first approach, the reliability analysis may proceed from an assumption of a smooth and homogenous surface of the sample 130 and/or an accurate positioning of the sample 130 at the target position 130a.

Consequently, the image analysis may aim at identifying one or more predefined irregularities pertaining to the sample 130 depicted in the captured one or more images, for example one or more of the following:

- variation of color and/or glossiness on the surface of the sample 130, which may serve to indicate non-homogenous or contaminated sample surface;
- a lack of glossiness on the surface of the sample 130, which may serve to indicate a rough sample surface that is not properly prepared for the measurement;
- a predefined one of presence or absence of grinding marks on the surface of the sample 130, which may serve to suggest, respectively, a ground sample surface when no grinding of the sample surface is assumed or unground sample surface when grinding of the sample surface is assumed;
- a presence of any of one or more predefined colors associated with oxidation on the surface of the sample 130;
- a presence of any of one or more predefined colors associated with coating on the surface of the sample 130;
- an uneven surface of the sample 130, which may serve to indicate geometrical irregularity of sample surface;
- an area of the surface of the sample 130 smaller than a predefined threshold, which may serve to indicate a sample that is too small for a reliable analysis,
- an incorrect focus on the surface of the sample 130, which may serve to indicate a sample that is not properly positioned at the target position.

In the first approach, the image analysis may be carried out directly on the image content of the captured one or more images or the image analysis may be carried out on one or more image features extracted from the captured one or more images, where the one or more image features may be descriptive of respective predefined characteristics of the image content of the captured one or more images. According to an example in this regard, each of the predefined irregularities under consideration may be identified via application of respective one or more predefined rules that are applicable for identification of a respective predefined irregularity, whereas in another example the identification of the one or more predefined irregularities may rely on an artificial intelligence (AI).

For the predefined-rule-based identification, one or more suitable image analysis techniques known in the art may be applied. In an example in this regard, the respective one or more rules may be applicable for identifying one of presence or absence of the respective predefined irregularity in the captured one or more images, thereby suggesting either estimated unreliability or estimated reliability of the associated measurement in view of the respective predefined irregularity. Hence, in case only a single predefined irregularity is considered, the presence or absence of the respective irregularity directly indicates the estimated unreliability or reliability of the associated measurement, whereas in case a plurality of predefined irregularities are considered, the associated measurement may be estimated as unreliable in case of presence of respective predefined irregularity is identified for at least a predefined amount of the plurality predefined irregularities (and the associated measurement may be estimated as reliable otherwise).

In another example of the predefined-rule-based identification, the respective one or more rules may be applicable for determining a likelihood of the respective predefined irregularity appearing in the captured one or more images, which may serve as a respective unreliability score that is descriptive of an estimated extent of unreliability of the associated measurement in view of the respective predefined irregularity, where the unreliability score may indicate the extent of unreliability in a predefined scale, e.g. in a scale from 0 to 100. In case only a single predefined irregularity is considered, the unreliability score obtained therefor is directly descriptive of the unreliability of the associated measurement, whereas in case multiple predefined irregularities are considered, an overall estimated unreliability may be defined as a combination of the respective individual unreliability scores determined therefor, e.g. as an average or a sum of the individual unreliability scores.

In an example of the AI-based identification, the controller 108 may apply a respective artificial neural network (ANN) that is trained to identify the respective one of the one or more predefined irregularities in the captured one or more images, where the input to the ANN include the captured one or more images and where the output of the ANN may include in indication of either presence or absence of the respective irregularity in the captured one or more images and/or an indication of the likelihood of the respective irregularity in the captured one or more images (depending on the applied approach). In this regard, the ANN pertaining to a certain predefined irregularity may be trained using supervised learning via usage of learning data that includes a plurality of annotated training images depicting a respective plurality of samples, where the learning data includes a first plurality of training images that depict samples exhibiting the respective irregularity and a second plurality of training images that depict samples not exhibiting the respective irregularity. For each of the training images, the respective annotation indicates one of presence or absence of the respective irregularity in the respective training image (to enable classification of a measurement into one of unreliable or reliable) and/or the likelihood of the respective irregularity appearing in (e.g. an unreliability score assigned to) the respective training image (to enable derivation of a respective unreliability score for a measurement). While the present example refers to application of machine learning in context of the ANN, in other examples an AI model different from the ANN, such as a decision tree or a support-vector machine (SVM), may be applied instead.

In a variation of the pre-defined-rule-based examples of identifying the one or more predefined irregularities in the captured one or more images described above, the one or more predefined rules may be ones that are applicable for identifying any of the one or more predefined irregularities in the captured one or more images. Along similar lines, in a variation of the AI-based examples of identifying the one or more predefined irregularities in the captured one or more images described above, the ANN (or an AI model of other type) may be trained to identify any of the one or more predefined irregularities in the captured one or more images. In such a variation, the first plurality of training images applied in the supervised learning for training the ANN model includes annotated training images that depict samples exhibiting at least one of the one or more predefined irregularities, the resulting ANN model thereby providing an output that directly indicates one of presence or absence of any of the one or more predefined irregularities and/or indicates the likelihood of any of the one or more predefined irregularities appearing in the captured one or more images provided as input to the ANN model.

In a second approach, the reliability analysis may comprise an image analysis carried out on the captured one or more images in consideration of advance knowledge of expected visual characteristics of the sample 130 but without considering the measurement t obtained from the associated measurement. Hence, like in the first approach described in the foregoing, the reliability analysis according to the second approach may be carried out and/or completed before the associated measurement, concurrently with the associated measurement, or after the associated measurement.

In the second approach, the controller 108 may obtain knowledge of one or more expected visual characteristics of the sample 130 (i.e. one or more expected visual sample characteristics), whereas the image analysis may proceed from an assumption that the sample 130 as depicted in the captured one or more images exhibits these one or more expected visual sample characteristics that are known in advance and, consequently, the image analysis carried out in context of the reliability analysis may aim at identifying the one or more expected visual sample characteristics in the captured one or more images. As an example in this regard, the image analysis may aim at one of confirming or disproving presence of the one or more expected visual sample characteristics in the captured one or more images.

Along the lines described for the first approach above, also in the second approach the image analysis may be carried out directly on basis of the captured one or more images or the image analysis may be carried out on basis of one or more image features extracted from the captured one or more images. As a non-limiting example, the one or more expected visual sample characteristics under consideration may comprise one or more of the following: an expected color of the sample 130, an expected extent of glossiness of the sample 130, a predefined one of expected presence or expected absence of grinding marks on the sample.

The controller 108 may obtain the knowledge of the one or more expected visual sample characteristics, for example, via the UI of the analyzer instrument. In this regard, the information received via the UI may directly indicate a respective expected visual sample characteristic and/or the information received via the UI may involve a sample type associated with the sample 130, where the sample type enables acquiring respective one or more expected visual sample characteristics from a predefined sample type information database, the sample type thereby indirectly indicating the one or more expected visual sample characteristics. The sample type information database may define a respective mapping between a plurality of sample types and corresponding one or more expected visual sample characteristics, whereas the controller 108 may apply the use-indicated sample type to obtain the corresponding one or more expected visual sample characteristics from the sample information database. The sample information database may be available in the controller 108 and/or it may be available in another apparatus. In the latter case, the controller 108 may access the sample information database e.g. via the communication apparatus available in the analyzer instrument. As an example in this regard, expected visual sample characteristics pertaining to certain metal samples may include one of one or more predefined colors (e.g. light gray for aluminum alloys, yellow or red for brass alloys, etc.), glossy sample surface and presence of grinding marks on the sample surface (as an indication of freshly prepared sample surface). In another example, the expected visual sample characteristics pertaining to certain types of glass or plastic may include white color and glossy sample surface.

Further along the lines described above for the first above, in an example, the image analysis according to the second approach may aim at identifying the one or more expected visual sample characteristics in the captured one or more images via application of respective one or more predefined rules, where the one or more rules are applicable for identification of a respective one the respective expected visual sample characteristic. In this regard, the image analysis may be carried out using suitable image analysis technique(s) known in the art. In another example, the identification of the one or more expected visual sample characteristics may rely on an AI model, such as the ANN, the decision tree or the SVM, where the AI model pertaining to a certain visual sample characteristic may be one trained to identify the respective visual sample characteristic in the captured one or more images e.g. via supervised learning outlined in the foregoing in description of the first example. In this regard, the description provided for AI-model-based identification of the one or more predefined irregularities in context of the first approach applies for identification of the one or more expected sample characteristics in the second approach as well, mutatis mutandis. Herein, a difference to the first approach is that while in context of the first approach successful identification of a certain predefined irregularity in the captured one or more images suggests unreliability of the associated measurement in consideration of the respective predefined irregularity, in the second example the logic is the opposite, i.e. successful identification of a certain expected visual sample characteristic suggests reliability of the associated measurement in consideration of the respective expected visual sample characteristic (while a failure to identify the respective expected visual sample characteristic suggests unreliability of the associated measurement in consideration of the respective expected visual sample characteristic).

Further along the lines described above for the first approach above, in one example the outcome of the reliability analysis according to the second approach may comprise an indication of either estimated unreliability or estimated reliability of the associated measurement, whereas in another example the outcome of the reliability analysis according to the second approach may comprise the unreliability score that is descriptive of the estimated extent of unreliability of the associated measurement.

In a third approach, the reliability analysis may comprise an image analysis carried out on the captured one or more images in consideration of the measurement result obtained from the associated measurement. Hence, unlike in the first and second approaches described in the foregoing, the reliability analysis according to the third approach cannot be completed before the associated measurement or concurrently with the associated measurement but it is completed after the associated measurement, even though the aspect of capturing the one or more images of the sample 130 is preferably carried out before the associated measurement.

Like in the second approach, also in the third approach the image analysis is carried out in consideration of one or more expected visual characteristics of the sample 130 (i.e. the expected visual sample characteristics). In this regard, the reliability analysis according to the third approach is similar to that of the second approach apart from the different manner of acquiring information about the one or more expected visual characteristics of the sample 130: in the third approach the controller 108 may obtain the one or more expected visual sample characteristics via consulting a predefined element information database in view of the measurement result obtained in the associated measurement. The element information database may define a respective mapping between a plurality of elements and corresponding one or more visual characteristics, whereas the measurement result indicates the element(s) included in the sample 130. Consequently, with the knowledge of the elements included in the sample 130, the controller 108 is able to obtain information that defines the one or more expected visual characteristics the sample 130 from the element information database. The element information database may be available in the analyzer instrument or in another device, whereas in the latter case the controller 108 may be able to access the element information database via the communication apparatus available in the analyzer instrument.

As described in the foregoing, the controller 108 is arranged to selectively issue an indication pertaining to reliability of a measurement in dependence of the estimated reliability of the respective measurement. In an example, assuming that the estimated reliability obtained as an outcome of the reliability analysis comprises the indication of either reliability or unreliability of the associated measurement, the controller 108 may provide an indication of possibly unreliable measurement in case the outcome of the reliability analysis suggests unreliability of the associated measurement and/or the controller 108 may provide an indication of a likely reliable measurement in case the outcome of the reliability analysis suggests reliability of the analysis. In another example, assuming that the estimated reliability obtained as an outcome of the reliability analysis comprises the unreliability score, the controller 108 may provide an indication of possibly unreliable measurement in case the unreliability score exceeds a predefined threshold value and/or the controller 108 may provide an indication of a likely reliable measurement in case the unreliability score fails to reach the predefined threshold.

In an example, the indication pertaining to reliability of a measurement may comprise an alert or warning issued in response to finding the associated measurement unreliable via the reliability analysis. As an example this regard, the controller 108 may issue the alert or warning via operating the UI of the analyzer instrument to display a visual indication of possibly unreliable measurement result, where the visual indication may comprise a symbol and/or text that serves as an indication of possibly unreliable measurement result. In such an example, assuming the unreliability score as the outcome of the reliability analysis, the visual indication may comprise the unreliability score or another value derived from the unreliability score. In another example, the controller 108 issuing the alert or warning may comprise the controller 108 operating the UI of the analyzer instrument to provide an audible indication of possibly unreliable measurement result, e.g. via operating the UI of the analyzer instrument to play back a sound that serves as the indication of possibly unreliable measurement.

As another example of the controller 108 selectively issuing an indication pertaining to reliability of a measurement, the controller 108 may store the result of the reliability analysis in a memory in the analyzer instrument together with the measurement result obtained from the associated measurement and/or to transmit the result of the reliability analysis together with the measurement result to the other device via usage of a communication apparatus available in the analyzer instrument. The controller 108 may proceed with storing and/or transmitting the result of the reliability analysis regardless of the outcome of the reliability analysis or the controller 108 may store and/or transmit the result of the reliability analysis only in case the associated measurement is found unreliable in the reliability analysis.

In each of the first, second and third approaches, the reliability analysis may be initiated in response to a user initiating a measurement procedure via the UI of the analyzer instrument. In all approaches, the controller 108 may operate the imaging apparatus 110 to capture the one or more images of the sample 130 before carrying out the respective measurement. In the first and second approaches, also the other aspects of the reliability analysis may be carried out before carrying out the associated measurement, thereby enabling the selective issuance of the indication pertaining to reliability of the measurement before proceeding with the measurement, whereas in the third approach the reliability analysis is necessarily completed only after the associated measurement and the selective issuance of the indication pertaining to reliability of the measurement may take place after the measurement.

In case the associated measurement is found possibly unreliable before the associated measurement has been carried out, the controller 108 may provide warning or alert concerning possibly unreliable measurement (e.g. the visual or audible indication described above) before proceeding with the measurement.

Moreover, in case the associated measurement is found possibly unreliable before the associated measurement has been carried out, the controller may further operate the UI of the analyzer instrument to provide the user with a choice of cancelling the measurement or proceeding with the measurement regardless (e.g. via requesting the user to confirm, via the UI, that the measurement is to be carried out despite its possible unreliability).

Throughout the examples described in the foregoing, the controller 108 is an entity responsible for carrying out the aspects of the reliability analysis, thereby enabling the reliability analysis pertaining to a measurement to be conducted in the analyzer instrument carrying out the associated measurement and enabling provision of immediate feedback to the user concerning estimated reliability of the associated measurement. In other examples, at least part of the reliability analysis may be carried out in another device, which may be referred to as a server apparatus. In such a scenario, the analyzer instrument may include a communication apparatus that enables wired or wireless communication with other apparatuses and the controller 108 may apply the communication apparatus to establish a connection with the server apparatus and to transfer data between the analyzer instrument and the server apparatus.

In such a scenario, the controller 108 may operate the measurement assembly 100 to capture the one or more images of the sample 130 (cf. block 202), e.g. before carrying out the measurement of the sample 130, carry out the measurement, and transmit the measurement result together with the captured one or more images to the server apparatus, whereas the server apparatus may determine the estimated reliability of the associated measurement on basis of the captured one or more images (cf. block 204) and selectively issue the indication pertaining to reliability of the measurement in dependence of the estimated reliability (cf. block 206). In this regard, the aspect of selectively issuing the indication pertaining to reliability of the measurement may comprise storing the result of the reliability analysis together with the measurement result of the associated measurement, either regardless of the outcome of the reliability analysis or only in case the associated measurement is found unreliable in the reliability analysis.

In a variation of the scenario described above, the server apparatus may only carry out the determination of the estimated reliability of the associated measurement on basis of the captured one or more images (e.g. the image analysis described in the foregoing) and transmit the result of the reliability analysis to the analyzer instrument, where the controller 108 may proceed with selectively issuing the indication pertaining to the reliability of the associated measurement accordingly, e.g. according to one or more of the examples described in the foregoing.

Figure 5:
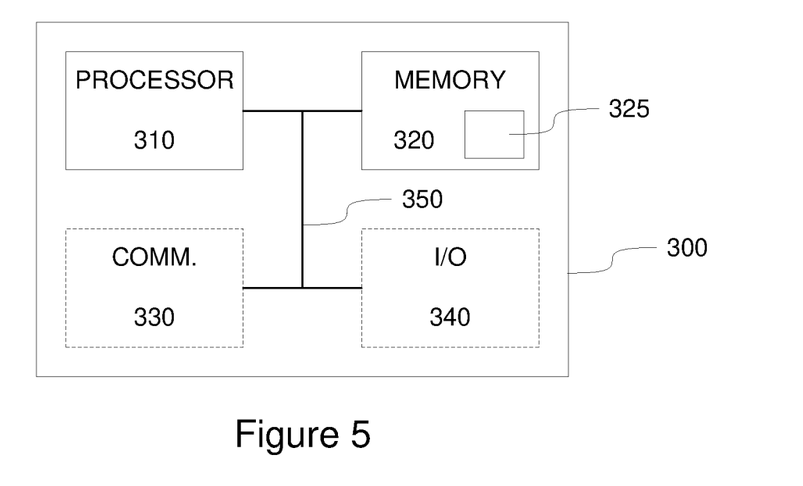
FIG. 5 depicts a block diagram of some elements of an apparatus according to an example.

Referring back to the example of FIG. 2, the controller 108 may be provided by a respective hardware means, by a respective software means or by a respective combination of a hardware means and a software means. As an example in this regard, FIG. 5 schematically depicts some components of an apparatus 300 that may be employed to implement the controller 108. The apparatus 300 comprises a processor 310 and a memory 320. The memory 320 may store data and computer program code 325. The apparatus 300 may further comprise communication means 330 for wired or wireless communication with other apparatuses and/or user I/O (input/output) components 340 that may be arranged, together with the processor 310 and a portion of the computer program code 325, to provide the UI of the analyzer instrument for receiving input from a user and/or for providing output to the user. In particular, the user I/O components may include user input means, such as one or more keys or buttons, a keyboard, a touchscreen or a touchpad, etc. The user I/O components may include output means, such as a display or a touchscreen. The components of the apparatus 300 are communicatively coupled to each other via a bus 350 that enables transfer of data and control information between the components.

The memory 320 and a portion of the computer program code 325 stored therein may be further arranged, with the processor 310, to provide the controller 108. The processor 310 is configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement at least some functions of the controller 108 when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus 300 to operate as the controller 108 e.g. according to operations, procedures and/or functions described in the foregoing. Hence, the apparatus 300 may comprise at least one processor 310 and at least one memory 320 including the computer program code 325 for one or more programs, the at least one memory 320 and the computer program code 325 configured to, with the at least one processor 310, cause the apparatus 300 to operate as the controller 108 e.g. in accordance with operations, procedures and/or functions described in the foregoing.

The computer program code 325 may be provided e.g. as a computer program product comprising at least one computer-readable non-transitory medium having the computer program code 325 stored thereon, which computer program code 325, when executed by the processor 310 causes the apparatus 300 to operate as the analyzer controller 108 e.g. according to operations, procedures and/or functions described in the foregoing. The computer-readable non-transitory medium may comprise a memory device or a record medium that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. An analyzer instrument for an analysis of an elemental composition of a sample using one of laser induced breakdown spectroscopy (LIBS), optical emission spectroscopy (OES), and X-ray fluorescence (XRF), the analyzer instrument comprising:
   a measurement assembly comprising:
      an exciter configured to generate an excitation directed at a target position to invoke an emission from the sample positioned at the target position,
      a detector assembly configured to receive the emission from the sample positioned at the target position, the detector assembly being configured to generate one or more measurement signals that are descriptive of said emission, the detector assembly using one of the LIBS, the OES, and the XRF, the one or more measurement signals being descriptive of relative light intensities at different wavelengths of the emission from the sample,
      an imaging apparatus configured to capture one or more images of an area around the target position, the imaging apparatus being separate from the detector assembly, and
   a controller configured to:
      carry out a measurement by operating the exciter to generate the excitation and by carrying out analysis of the elemental composition of the sample based on the one or more measurement signals generated by the detector assembly using one of the LIBS, the OES, and the XRF, and
      carry out a reliability analysis associated with the measurement carried out by operation of the exciter and based on the one or more measurement signals generated by the detector assembly using one of the LIBS, the OES, and the XRF, the carrying out the reliability analysis comprising
   operating the imaging apparatus to capture the one or more images of the sample,
   determining an estimated reliability of the measurement carried out by the operation of the exciter and based on the one or more measurement signals generated by the detector assembly using one of the LIBS, the OHS, and the XRF, based on the captured one or more images of the sample captured by the imaging apparatus, the estimated reliability being determined by analyzing a surface of the sample indicated by the captured one or more images, and selectively issuing an indication pertaining to reliability of the measurement depending on said estimated reliability based on the captured one or more images of the sample captured by the imaging apparatus.

2. The analyzer instrument according to claim 1, wherein the controller is configured to:
carry out an image analysis of the captured one or more images in order to identify one or more predefined irregularities pertaining to the sample in the captured one or more images, and
determine the estimated reliability based on the identified one or more predefined irregularities.

3. The analyzer instrument according to claim 2, wherein the controller is configured to carry out the image analysis by one of:
applying one or more predefined rules in order to identify presence of the one or more predefined irregularities in the captured one or more images, and
applying at least one artificial intelligence (AI) model trained to identify a presence of the one or more predefined irregularities in the captured one or more images.

4. The analyzer instrument according to claim 2, wherein the one or more predefined irregularities pertaining to the sample comprise one or more of the following:
a variation of color on the surface of the sample,
a variation of glossiness on the surface of the sample,
a lack of glossiness on the surface of the sample,
a predefined one of a presence or an absence of grinding marks on the surface of the sample,
a presence of any of one or more predefined colors associated with oxidation or coating on the surface of the sample,
an uneven surface of the sample,
a sample area smaller than a predefined threshold, and
an incorrect focus at the surface of the sample.

5. The analyzer instrument according to claim 1, wherein the controller is configured to:
carry out an image analysis in order to identify a presence of one or more predefined visual characteristics pertaining to the sample in the captured one or more images, and
determine the estimated reliability based on the identified one or more predefined visual characteristics.

6. The analyzer instrument according to claim 5, wherein the controller is configured to obtain said one or more predefined visual characteristics based on user-input that defines one or more expected visual characteristics of the sample.

7. The analyzer instrument according to claim 5, wherein the controller is configured to determine said one or more predefined visual characteristics based on a result of said analysis of elemental composition of the sample.

8. The analyzer instrument according to claim 7, wherein the controller is configured to determine said one or more predefined visual characteristics via usage of a predefined element information database that defines a respective mapping between a plurality of elements and corresponding one or more visual characteristics.

9. The analyzer instrument according to claim 5, wherein the applying respective one or more predefined rules in order to identify presence of the one or more predefined visual characteristics of the sample in the captured one or more images, and
applying at least one artificial intelligence (AI) model trained to identify a presence of the one or more expected characteristics of the sample in the captured one or more images.

10. The analyzer instrument according to claim 5, wherein the predefined characteristics include one or more of the following:
an expected color of the sample,
an expected extent of glossiness of the sample, and
a predefined one of an expected presence or an expected absence of grinding marks on the sample.

11. The analyzer instrument according to claim 1, wherein the controller is configured to determine one of reliability or unreliability of the measurement based on the captured one or more images of the sample, and
the controller is configured to provide an indication of estimated unreliability of the measurement in response to determining unreliability of the measurement.

12. The analyzer instrument according to claim 1, wherein the controller is configured to determine, based on the captured one or more images of the sample, an unreliability score that is descriptive of an estimated extent of unreliability of the measurement, and
the controller is configured to provide an indication of estimated unreliability of the measurement in response to the unreliability score exceeding a predefined threshold.

13. The analyzer instrument according to claim 11, wherein the controller is configured to provide the indication of estimated unreliability via one of:
providing a visual indication of an unreliable measurement via a user interface (UI) of the analyzer instrument,
providing an audible indication of an unreliable measurement via the UI of the analyzer instrument, and
providing a result of said analysis of elemental composition of the sample with an indication of an unreliable measurement.

14. The analyzer instrument according to claim 12, wherein the controller is configured to provide the indication of estimated unreliability via one of:
providing a visual indication of an unreliable measurement via a user interface (UI) of the analyzer instrument,
providing an audible indication of an unreliable measurement via the UI of the analyzer instrument, and
providing a result of said analysis of elemental composition of the sample with an indication of an unreliable measurement.

15. The analyzer instrument according to claim 3, wherein the one or more predefined irregularities pertaining to the sample comprise one or more of the following:
a variation of color on the surface of the sample,
a variation of glossiness on the surface of the sample,
a lack of glossiness on the surface of the sample,
a predefined one of a presence or an absence of grinding marks on the surface of the sample,
a presence of any of one or more predefined colors associated with oxidation or coating on the surface of the sample,
an uneven surface of the sample,
a sample area smaller than a predefined threshold, and
an incorrect focus at the surface of the sample.

16. The analyzer instrument according to claim 6, wherein the controller is configured to carry out the image analysis by one of:

applying respective one or more predefined rules in order to identify presence of the one or more predefined visual characteristics of the sample in the captured one or more images, and applying at least one artificial intelligence (AI) model trained to identify a presence of the one or more expected characteristics of the sample in the captured one or more images.

17. The analyzer instrument according to claim 7, wherein the controller is configured to carry out the image analysis by one of:

applying respective one or more predefined rules in order to identify presence of the one or more predefined visual characteristics of the sample in the captured one or more images, and applying at least one artificial intelligence (AI) model trained to identify a presence of the one or more expected characteristics of the sample in the captured one or more images.

18. The analyzer instrument according to claim 8, wherein the controller is configured to carry out the image analysis by one of:

applying respective one or more predefined rules in order identify presence of the one or more predefined visual characteristics of the sample in the captured one or more images, and applying at least one artificial intelligence (AI) model trained to identify a presence of the one or more expected characteristics of the sample in the captured one or more images.

19. A method for analysis of elemental composition of a sample using one of laser induced breakdown spectroscopy (LIBS), optical emission spectroscopy (OBS), and X-ray fluorescence (XRF), the method comprising:

carrying out a measurement that comprises operating an exciter to generate an excitation directed at a target position to invoke an emission from the sample positioned at the target position, operating a detector assembly to generate one or more measurement signals that are descriptive of said emission, the detector assembly using one of the LIBS, the OES, and the XRF, the one or more measurement signals being descriptive of relative light intensities at different wavelengths of the emission from the sample, and carrying out an analysis of the elemental composition of the sample based on the one or more measurement signals generated by the detector assembly using one of the LIBS, the OES, and the XRF; and carrying out a reliability analysis associated with the measurement, the reliability analysis comprising:

capturing one or more images of the sample by an imaging apparatus, the imaging apparatus being separate from the detector assembly, determining an estimated reliability of the measurement carried out by operation of the exciter and based on the one or more measurement signals generated by the detector assembly using one of the LIBS, the OES, and the XRF, based on the captured one or more images of the sample captured by the imaging apparatus, the estimated reliability being determined by analyzing a surface of the sample indicated by the captured one or more images, and selectively issuing an indication pertaining to reliability of the measurement depending on said estimated reliability based on the captured one or more images of the sample captured by the imaging apparatus.

* * * * *